US011656630B2

(12) United States Patent
Jonak et al.

(10) Patent No.: US 11,656,630 B2
(45) Date of Patent: May 23, 2023

(54) AUTONOMOUS MAP TRAVERSAL WITH WAYPOINT MATCHING (71) Applicant: Boston Dynamics, Inc., Waltham, MA (US)

(72) Inventors: Dom Jonak, Waltham, MA (US); Marco da Silva, Arlington, MA (US); Joel Chestnutt, Natick, MA (US); Matt Klingensmith, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 17/157,405

(22) Filed: Jan. 25, 2021

(65) Prior Publication Data
US 2021/0141389 A1 May 13, 2021

Related U.S. Application Data (63) Continuation of application No. 16/295,592, filed on Mar. 7, 2019.
(Continued)

(51) Int. Cl.
G05D 1/02 (2020.01)
G06T 7/73 (2017.01)
(Continued)

(52) U.S. Cl.
CPC ............ *G05D 1/0274* (2013.01); *G01S 17/89* (2013.01); *G05D 1/027* (2013.01); *G05D 1/0251* (2013.01);
(Continued)

(58) Field of Classification Search
CPC ................. G05D 1/0274; G05D 1/024; G05D 2201/0203; G05D 2201/0206;
(Continued)

(56) References Cited

U.S. PATENT DOCUMENTS 8,548,734 B2  10/2013  Barbeau et al.
8,849,494 B1   9/2014  Herbach et al.
(Continued)

FOREIGN PATENT DOCUMENTS

CN   203371557 U  *  1/2014
CN   108052103       5/2018
(Continued)

OTHER PUBLICATIONS boost.org, "buffer (with strategies)", https://www.boost.org/doc/libs/1_75_0/libs/geometry/doc/html/geometry/reference/algorithms/buffer/buffer_7_with_strategies.html, downloaded Feb. 1, 2023, 5 pages.
(Continued)

*Primary Examiner* — Maceeh Anwari
*Assistant Examiner* — Aarron E Santos
(74) *Attorney, Agent, or Firm* — Knobbe, Martens, Olson & Bear, LLP (57) ABSTRACT A robot includes a drive system configured to maneuver the robot about an environment and data processing hardware in communication with memory hardware and the drive system. The memory hardware stores instructions that when executed on the data processing hardware cause the data processing hardware to perform operations. The operations include receiving image data of the robot maneuvering in the environment and executing at least one waypoint heuristic. The at least one waypoint heuristic is configured to trigger a waypoint placement on a waypoint map. In response to the at least one waypoint heuristic triggering the waypoint placement, the operations include recording a waypoint on the waypoint map where the waypoint is associated with at least one waypoint edge and includes sensor data obtained by the robot. The at least one waypoint edge includes a pose transform expressing how to move between two waypoints.

20 Claims, 8 Drawing Sheets

Related U.S. Application Data (60) Provisional application No. 62/745,013, filed on Oct. 12, 2018.

(51) Int. Cl.
| | | |
|---|---|---|
| *G06T 7/521* | (2017.01) | |
| *G06T 7/13* | (2017.01) | |
| *G06T 7/593* | (2017.01) | |
| *G01S 17/89* | (2020.01) | |
| *G06V 20/10* | (2022.01) | |

(52) U.S. Cl.
CPC ............... *G06T 7/13* (2017.01); *G06T 7/521* (2017.01); *G06T 7/593* (2017.01); *G06T 7/74* (2017.01); *G06V 20/10* (2022.01); *G05B 2219/40298* (2013.01); *G05D 1/0214* (2013.01); *G06T 2207/10012* (2013.01); *G06T 2207/10028* (2013.01)

(58) Field of Classification Search
CPC .. G05D 1/0227; G05D 1/0246; G05D 1/0272; G05D 1/0242; G05D 1/0038; G05D 1/0251; G05D 1/0255; G05D 1/027; G05D 1/0088; G05D 2201/0211; G05D 2201/0215; G05D 1/0253; G05D 2201/0216; G05D 1/0011; G05D 1/0219; G05D 1/0238; G05D 1/0214; G05D 2201/0209; G05D 1/021; G05D 2201/0213; G05D 1/0022; G05D 1/0225; G05D 2201/02; G05D 2201/0207; G05D 1/0016; G05D 1/0027; G05D 1/0217; G05D 1/0259; G05D 1/0261; G05D 1/028; G05D 1/0212; G05D 1/0248; G05D 1/0278; G05D 1/0223; G05D 1/0257; G05D 1/0221; G05D 1/0282; G05D 1/00; G05D 1/0094; G05D 1/02; G05D 1/0287; G05D 1/0291; G05D 1/08; G05D 2201/0201; G05D 2201/0202; G06V 20/10; G06V 20/64; G06V 10/44; G06V 10/40; G06V 10/42; G06V 20/20; G06V 10/147; G06V 10/242; G06V 10/245; G06V 10/10; G06V 20/56; G06V 20/58; G06V 10/422; G06V 10/462; G06V 30/422; G06V 2201/12; G06V 10/24; G06V 10/30; G06V 10/757; G06V 20/52; G06V 10/60; G06V 10/751; G06V 40/20; G06V 10/25; G06V 10/507; G06V 20/00; G06V 30/194; G06V 20/63; G06V 2201/034; G06V 40/107; G06V 40/172; G06V 10/143; G06V 10/145; G06V 10/243; G06V 10/443; G06V 10/464; G06V 10/56; G06V 20/588; G06V 20/647; G06V 2201/09; G06V 30/224; G06V 30/2247; G06V 40/165; G06V 40/193; G06V 40/28; G06V 10/17; G06V 10/22; G06V 10/255; G06V 10/46; G06V 40/113; G06V 40/166; G06V 40/19; G06V 10/141; G06V 10/225; G06V 10/32; G06V 10/754; G06V 20/13; G06V 20/44; G06V 20/586; G06V 2201/11; G06V 30/242; G06V 30/2504; G06V 40/103; G06V 40/161; G06V 40/174; G06V 40/18; G06V 10/28; G06V 10/82; G06V 10/987; G06V 10/993; G06V 20/176; G06V 20/46; G06V 20/582; G06V 20/584; G06V 20/80; G06V 2201/07; G06V 30/142; G06V 40/167; G06V 40/23; A47L 2201/04; A47L 11/4061; A47L 11/4011; A47L 9/2852; A47L 9/2826; A47L 2201/06; A47L 11/4066; A47L 2201/00; A47L 9/28; A47L 9/2894; A47L 11/30; A47L 11/4016; A47L 11/4044; A47L 11/4083; A47L 11/4088; A47L 9/2805; A47L 11/28; A47L 11/4005; A47L 11/4036; A47L 11/4041; A47L 11/4052; A47L 2201/02; A47L 2201/022; A47L 5/22; A47L 9/009; A47L 9/02; A47L 9/04; A47L 9/0472; A47L 9/0477; A47L 9/0488; A47L 9/2857; A47L 9/2873; A47L 9/2889; B60R 19/483; B60R 1/00; B60R 2300/301; B60R 2300/205; B60R 2300/105; B60R 2300/107; B60R 2300/302; B60R 2300/303; B60R 2021/0004; B60R 2021/0006; B60R 2021/23107; B60R 2021/23153; B60R 2021/23169; B60R 2021/23192; B60R 2021/23308; B60R 2021/23316; B60R 2021/23324; B60R 2021/23504; B60R 2021/23514; B60R 2021/23519; B60R 2021/23523; B60R 2021/2612; B60R 2021/2636; B60R 21/0132; B60R 21/16; B60R 21/2032; B60R 21/206; B60R 21/213; B60R 21/214; B60R 21/232; B60R 21/233; B60R 21/235; B60R 21/239; B60R 21/26; B60R 21/264; B60R 21/30; B60R 11/04; B60R 2300/30; B60R 2300/607; B60R 2300/802; B60R 2300/804

See application file for complete search history.

(56) References Cited

U.S. PATENT DOCUMENTS

| | | | |
|---|---|---|---|
| 8,930,058 B1 | 1/2015 | Quist et al. | |
| 9,352,470 B1 * | 5/2016 | da Silva | B25J 13/088 |
| 9,586,316 B1 | 3/2017 | Swilling | |
| 9,717,387 B1 | 8/2017 | Szatmary et al. | |
| 9,933,781 B1 | 4/2018 | Bando et al. | |
| 9,975,245 B1 | 5/2018 | Whitman | |
| 10,226,870 B1 * | 3/2019 | Silva | B62D 57/032 |
| 11,268,816 B2 | 3/2022 | Fay et al. | |
| 2006/0167621 A1 | 7/2006 | Dale | |
| 2008/0086241 A1 | 4/2008 | Phillips et al. | |
| 2009/0125225 A1 | 5/2009 | Hussain et al. | |
| 2010/0066587 A1 | 3/2010 | Yamauchi et al. | |
| 2010/0172571 A1 | 7/2010 | Yoon et al. | |
| 2012/0089295 A1 | 4/2012 | Ahn et al. | |
| 2012/0182392 A1 | 7/2012 | Kearns et al. | |
| 2013/0141247 A1 | 6/2013 | Ricci | |
| 2013/0231779 A1 | 9/2013 | Purkayastha et al. | |
| 2013/0325244 A1 | 12/2013 | Wang et al. | |
| 2014/0188325 A1 * | 7/2014 | Johnson | G01S 17/08 901/1 |
| 2015/0158182 A1 | 6/2015 | Farlow et al. | |
| 2015/0355638 A1 | 12/2015 | Field et al. | |
| 2017/0131102 A1 | 5/2017 | Wirbel et al. | |
| 2017/0203446 A1 | 7/2017 | Dooley et al. | |
| 2018/0173242 A1 | 6/2018 | Lalonde et al. | |
| 2019/0079523 A1 | 3/2019 | Zhu et al. | |
| 2019/0187703 A1 | 6/2019 | Millard et al. | |
| 2019/0318277 A1 | 10/2019 | Goldman et al. | |
| 2020/0117214 A1 | 4/2020 | Jonak et al. | |
| 2020/0249033 A1 | 8/2020 | Gelhar | |
| 2020/0409382 A1 * | 12/2020 | Herman | A47L 9/30 |
| 2021/0041243 A1 | 2/2021 | Fay et al. | |
| 2022/0155078 A1 | 5/2022 | Fay et al. | |

(56) References Cited

U.S. PATENT DOCUMENTS

| | | | |
|---|---|---|---|
| 2022/0388170 A1 | 12/2022 | Merewether | |
| 2022/0390950 A1 | 12/2022 | Yamauchi | |
| 2022/0390954 A1 | 12/2022 | Klingensmith | |

FOREIGN PATENT DOCUMENTS

| | | | | | |
|---|---|---|---|---|---|
| CN | 111604916 A | * | 9/2020 | | |
| CN | 211956515 U | * | 11/2020 | | |
| CN | 112034861 A | * | 12/2020 | | |
| CN | 113633219 | | 11/2021 | | |
| JP | H09-134217 | | 11/2003 | | |
| JP | 2006-011880 | | 1/2006 | | |
| JP | 2008-072963 | | 4/2008 | | |
| JP | 2013-250795 | | 12/2013 | | |
| JP | 2014-123200 | | 7/2014 | | |
| JP | 2016-081404 | | 5/2016 | | |
| JP | 2016-103158 | | 6/2016 | | |
| KR | 10-1121763 | | 3/2012 | | |
| WO | WO-2007051972 A1 | * | 5/2007 | ........... | G05D 1/0221 |
| WO | WO2017/090108 | | 6/2017 | | |
| WO | WO 2020/076422 | | 4/2020 | | |
| WO | WO 2021/025707 | | 2/2021 | | |
| WO | WO 2022/256811 | | 12/2022 | | |
| WO | WO 2022/256815 | | 12/2022 | | |
| WO | WO 2022/256821 | | 12/2022 | | |

OTHER PUBLICATIONS

International Search Report and Written Opinion for PCT Application No. PCT/US2019/047804 dated Apr. 6, 2020 in 14 pages.
International Search Report and Written Opinion for PCT Application No. PCT/US2019/051092, dated Apr. 30, 2020, 12 pages.
International Search Report and Written Opinion for PCT Application No. PCT/US2022/072710 dated Sep. 27, 2022, 16 pages.
International Search Report and Written Opinion for PCT Application No. PCT/US2022/072703, dated Sep. 22, 2022, 13 pages.
International Search Report and Written Opinion for PCT Application No. PCT/US2022/072717, dated Sep. 30, 2022, 26 pages.
Buchegger et al. "An Autonomous Vehicle for Parcel Delivery in Urban Areas" International Conference on Intelligent Transportation Systems (ITSC) Nov. 2018.
Collins et al. "Efficient Planning for High-Speed MAV Flight in Unknown Environments Using Online Sparse Topological Graphs" IEEE International Conference on Robotics and Automation (ICRA) Aug. 2020.
github.com, "cartographer-project/cartographer", https://github.com/cartographer-project/cartographer, downloaded Jan. 10, 2023, 4 pages.
Kuipers et al. "A Robot Exploration and Mapping Strategy Based on a Semantic Hierarchy of Spatial Representations" Journal of Robotics & Autonomous Systems vol. 8, 1991, pp. 47-63.
Mendes et al., "ICP-based pose-graph SLAM", International Symposium on Safety, Security and Rescue Robotics (SSRR), Oct. 2016, Lausanne, Switzerland, pp. 195-200, ff10.1109/SSRR.2016.7784298, hal-01522248.
Thrun et al, "The GraphSLAM Algorithm with Applications to Large-Scale Mapping of Urban Structures", The International Journal of Robotics Research, vol. 25, No. 5-6, May-Jun. 2006, pp. 403-429.
Video game, "Unreal Engine 5", https://docs.unrealengine.com/5.0/en-US/basic-navigation-in-unreal-engine/, downloaded Jan. 10, 2023, 13 pages.
Whelan et al, "ElasticFusion: Dense SLAM Without A Pose Graph", http://www.roboticsproceedings.org/rss11/p01.pdf, downloaded Jan. 10, 2023, 9 pages.
wilipedia.org, "Buffer (GIS)", http://wiki.gis.com/wiki/index.php/Buffer_(GIS)#:~:text=A%20'polygon%20buffer'%20is%20a,Buffer%20around%20line%20features, downloaded Feb. 1, 2023, 4 pages.
wikipedia.org, "Probabilistic roadmap", https://en.wikipedia.org/wiki/Probabilistic_roadmap, downloaded Jan. 10, 2023, 2 pages.
wikipedia.org, "Rapidly-exploring random tree", https://en.wikipedia.org/wiki/Rapidly-exploring_random_tree, downloaded Jan. 10, 2023, 7 pages.
wikipedia.org, "Visibility graph", https://en.wikipedia.org/wiki/Visibility_graph, downloaded Jan. 10, 2023, 3 pages.
Yamauchi et al. "Place Recognition in Dynamic Environments" Journal of Robotic Systems, Special Issue on Mobile Robots, vol. 14, No. 2, Feb. 1997, pp. 107-120.
Yamauchi et al. "Spatial Learning for Navigation in Dynamic Environments" IEEE Transactions on Systems, Man, and Cybernetics—Part B: Cybernetics, Special Issue on Learning Autonomous Robots, vol. 26, No. 3, Jun. 1996, pp. 496-505.

* cited by examiner

AUTONOMOUS MAP TRAVERSAL WITH WAYPOINT MATCHING

CROSS REFERENCE TO RELATED APPLICATIONS

This U.S. patent application is a continuation of, and claims priority under 35 U.S.C. § 120 from, U.S. patent application Ser. No. 16/295,592, filed on Mar. 7, 2019, which claims priority under 35 U.S.C. § 119(e) to U.S. Provisional Application 62/745,013, filed on Oct. 12, 2018. The disclosures of these prior applications are considered part of the disclosure of this application and are hereby incorporated by reference in their entireties.

TECHNICAL FIELD

This disclosure relates to autonomous map traversal with waypoint matching.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability to operate autonomously may enhance a robots functionality and provide additional benefits to such industries.

SUMMARY

One aspect of the disclosure provides a method for autonomous map traversal. The method includes receiving, at data processing hardware, sensor data of an environment about a robot maneuvering in the environment. The sensor data includes image data. The method also includes executing, by the data processing hardware, at least one waypoint heuristic based on the image data. The at least one waypoint heuristic is configured to trigger a waypoint placement on a waypoint map. In response to the at least one waypoint heuristic triggering the waypoint placement, the method includes recording, by the data processing hardware, a waypoint on the waypoint map. The waypoint is associated with at least one waypoint edge and includes at least some of the sensor data obtained by the robot. The at least one waypoint edge includes a pose transform expressing how to move between two waypoints.

Implementations of the disclosure may include one or more of the following optional features. In some implementations, the image data includes three-dimensional point cloud data captured by a three-dimensional volumetric image sensor. Here, the three-dimensional volumetric image sensor may include one or more of a stereo camera, a scanning light-detection and ranging (LIDAR) sensor, or a scanning laser-detection and ranging (LADAR) sensor. The waypoint heuristic may be configured to detect a threshold feature detection within the image data at a current location of the robot.

In some examples, the sensor data of the waypoint includes three-dimensional point cloud data captured by a three-dimensional volumetric image sensor and pose data including inertial measurement data measured by an inertial measurement unit (IMU) of the robot. For a given waypoint, the method may include identifying neighboring waypoints to the given waypoint and identifying three-dimensional points of the three-dimensional point cloud data of the given waypoint and the neighboring waypoints as a collection of three-dimensional points. For a given waypoint, the method may also include determining whether the three-dimensional points of the collection of three-dimensional points correspond to a visual edge of an image represented by the three-dimensional point cloud data and associating with the given waypoint the three-dimensional points of the collection of three-dimensional points that correspond to the visual edge of the image represented by the three-dimensional point cloud data.

In some configurations, the waypoint includes a robot pose constraint configured to cause the robot to achieve an oriented pose at the waypoint. The waypoint map may be locally consistent with neighboring waypoints. The waypoint edge may include an annotation indicating a spatial feature of the environment. Recording the waypoint on the waypoint map include recording a basin zone around the waypoint, the basin zone designating an area adjacent to the waypoint where a robot is configured to use an iterative closest points (ICP) algorithm.

Another aspect of the disclosure provides a robot. The robot includes a drive system configured to maneuver the robot about an environment and data processing hardware in communication with the drive system. The robot also includes memory hardware in communication with the data processing hardware. The memory hardware stores instructions that when executed on the data processing hardware cause the data processing hardware to perform operations. The operations include receiving sensor data of the robot maneuvering in the environment. The sensor data includes image data. The operations further include executing at least one waypoint heuristic based on the image data. The at least one waypoint heuristic is configured to trigger a waypoint placement on a waypoint map. In response to the at least one waypoint heuristic triggering the waypoint placement, the operations include recording a waypoint on the waypoint map. The waypoint is associated with at least one waypoint edge and includes sensor data obtained by the robot. The at least one waypoint edge includes a pose transform expressing how to move between two waypoints.

Implementations of the disclosure may include one or more of the following optional features. In some examples, the image data includes three-dimensional point cloud data captured by a three-dimensional volumetric image sensor. Here, the image sensor includes one or more of a stereo camera, a scanning light-detection and ranging (LIDAR) sensor, or a scanning laser-detection and ranging (LADAR) sensor. The waypoint heuristic may be configured to detect a threshold feature detection within the image data at a current location of the robot.

In some implementations, the sensor data of the waypoint includes three-dimensional point cloud data captured by a three-dimensional volumetric image sensor and pose data including inertial measurement data measured by an inertial measurement unit (IMU) of the robot. For a given waypoint, the operations may include identifying neighboring waypoints to the given waypoint and identifying three-dimensional points of the three-dimensional point cloud data of the given waypoint and the neighboring waypoints as a collection of three-dimensional points. For a given waypoint, the operations may also include determining whether the three-dimensional points of the collection of three-dimensional points correspond to a visual edge of an image represented by the three-dimensional point cloud data and associating with the given waypoint the three-dimensional points of the collection of three-dimensional points that correspond to the visual edge of the image represented by the three-dimensional point cloud data.

In some configurations, the waypoint includes a robot pose constraint configured to cause the robot to achieve an oriented pose at the waypoint. The waypoint map may be locally consistent with neighboring waypoints. Additionally or alternatively, the waypoint edge may include an annotation indicating a spatial feature of the environment. Recording the waypoint on the waypoint map may include recording a basin zone around the waypoint, the basin zone designating an area adjacent to the waypoint where a robot is configured to use an iterative closest points (ICP) algorithm.

Yet another aspect of the disclosure provides a method for autonomous map traversal. The method includes receiving, at data processing hardware, image data of an environment about a robot maneuvering in the environment. The method also includes executing, by the data processing hardware, an iterative closest points (ICP) algorithm configured to localize to a first waypoint of a waypoint map based on the received image data. The method further includes executing, by the data processing hardware, a traversal path from the first waypoint of the waypoint map to a second waypoint of the waypoint map and updating, by the data processing hardware, a localization to the second waypoint of the waypoint map by the ICP algorithm based on the received image data.

Implementations of this aspect of the disclosure may include one or more of the following optional features. In some configurations, the image data includes three-dimensional point cloud data captured by a three-dimensional volumetric image sensor.

The image sensor may include one or more of a stereo camera, a scanning light-detection and ranging (LIDAR) sensor, or a scanning laser-detection and ranging (LADAR) sensor.

In some examples, updating the localization to the second waypoint includes comparing the received image data with stored image data of the waypoint map, the stored image data associated with the second waypoint. Additionally or alternatively, updating the localization to the second waypoint may include determining that a location associated with the localization satisfies a localization distance threshold and executing, by the data processing hardware, localization at the location according to kinematic data and inertial measurement data. Here, the localization distance threshold indicates a distance from a respective waypoint.

Another aspect of the disclosure provides a robot. The robot includes a body, legs coupled to the body and configured to maneuver the robot about an environment, and data processing hardware in communication with the legs. The robot also includes memory hardware in communication with the data processing hardware. The memory hardware stores instructions that when executed on the data processing hardware cause the data processing hardware to perform operations. The operations include receiving image data of an environment about a robot maneuvering in the environment. The operations also include executing an iterative closest points (ICP) algorithm configured to localize to a first waypoint of a waypoint map based on the received image data and executing a traversal path from the first waypoint of the waypoint map to a second waypoint of the waypoint map. The operations further include updating a localization to the second waypoint of the waypoint map by the ICP algorithm based on the received image data.

Implementations of this aspect of the disclosure may include one or more of the following optional features. In some implementations, the image data includes three-dimensional point cloud data captured by a three-dimensional volumetric image sensor. Here, the image sensor includes one or more of a stereo camera, a scanning light-detection and ranging (LIDAR) sensor, or a scanning laser-detection and ranging (LADAR) sensor.

In some examples, updating the localization to the second waypoint includes comparing the received image data with stored image data of the waypoint map, the stored image data associated with the second waypoint. Optionally, updating the localization to the second waypoint may also include determining that a location associated with the localization satisfies a localization distance threshold and executing, by the data processing hardware, localization at the location according to kinematic data and inertial measurement data. Here, the localization distance threshold indicates a distance from a respective waypoint.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
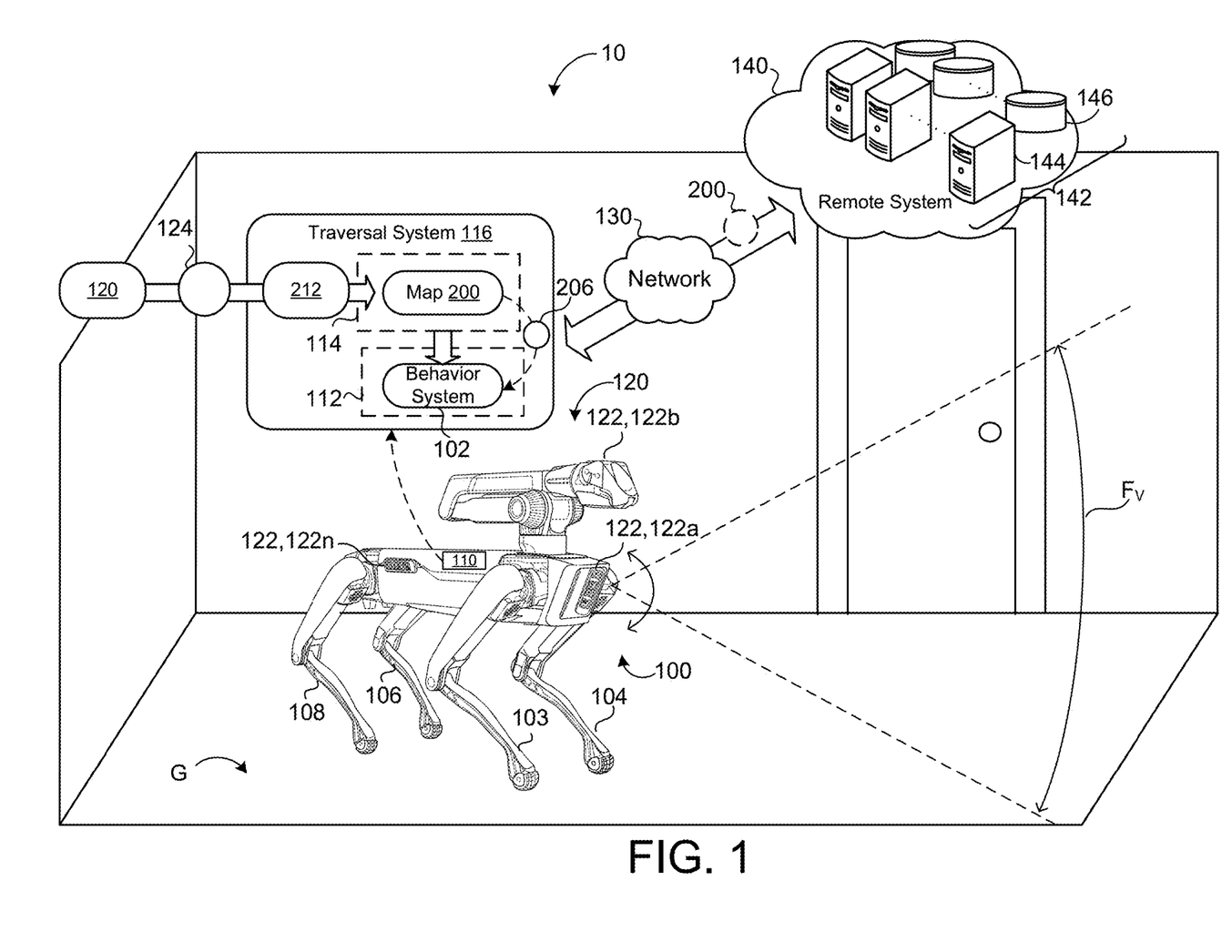
FIG. 1 is a schematic view of an example of a robot in a robotic environment.

FIG. 1 is an example of a robotic environment 10. The robotic environment 10 generally refers to a spatial area associated with some type of terrain that may be traversed by a robot 100 according to a map 200. For example, the terrain is an urban terrain, such as buildings, streets, sidewalks, parks, alleys, stairs, ramps, tunnels, etc., a rural terrain, such as roads, fields, hills, mountains, caves, etc., a subterranean terrain, such as caves, tunnels, etc., or any combination thereof. The robot 100 includes locomotion based structures such as legs and/or wheels attached to a body that enable the robot 100 to move about the robotic environment 10. Although FIG. 1 depicts a quadruped robot with four legs 103, 104, 106, 108, the robot 100 may include any number of legs or locomotive based structures (e.g., a biped or humanoid robot with two legs) that provides a means to traverse the robotic environment 10.

In some implementations, the robot 100 includes computing hardware 110 and at least one sensor system 120. The computing hardware 110 generally includes data processing hardware 112 and memory hardware 114. The computing hardware 110 is configured to control a robot traversal system 116. The robot traversal system 116 operates a behavior system 102 of the robot 100 to move the robot 100 about the robotic environment 10. The behavior system 102 is generally responsible for controlling (i.e. executing) behaviors of the robot 100. For example, the behavior system 102 controls different footstep patterns, leg patterns, body movement patterns, or vision system sensing patterns. The robot traversal system 116 operates the behavior system 102 based on at least one map 200 provided to the robot traversal system 116.

The traversal system 116 is configured to communicate with the memory hardware 114 of the robot 100 to provide the map 200 to operate the behavior system 102 using the data processing hardware 112 of the robot 100. In some examples, the memory hardware 114 stores the map 200 locally on the robot 100. In other examples, the map 200 is stored and/or accessed remotely by the traversal system 116. For example, the traversal system 116 communicates via a network 130 with a remote system 140. The remote system 140 may be a server or cloud-based environment that includes remote resources 142 such as remote data processing hardware 144 and remote memory hardware 146. In some implementations, the map 200 is stored and/or processed on the remote system 140 using remote resources 142 and is communicated to the traversal system 116 of the robot 100 via the network 130. In yet other examples, different parts of the map 200 are processed and/or stored remotely (e.g., via the remote system 140) and locally (e.g., via the computing hardware 110).

The sensor system 120 includes one or more sensors 122, 122a-n. The sensors 122 may include vision/image sensors, inertial sensors (e.g., an inertial measurement unit (IMU)), and/or kinematic sensors. Some examples of sensors 122 include a camera such as a stereo camera, a scanning light-detection and ranging (LIDAR) sensor, or a scanning laser-detection and ranging (LADAR) sensor. In some examples, the sensor 122 has a corresponding field(s) of view $F_v$ defining a sensing range or region corresponding to the sensor 122. For instance, FIG. 1 depicts a field of a view Fv for the robot 100. Each sensor 122 may be pivotable and/or rotatable such that the sensor 122 may, for example, change the field of view Fv about one or more axis (e.g., an x-axis, a y-axis, or a z-axis in relation to a ground plane G). In some implementations, the body of the robot 100 includes a sensor system 120 with multiple sensors 122 about the body to gather sensor data 124 in all directions around the robot 100. For example, the quadruped robot depicted in FIG. 1 includes a sensor 122 on its chest 122a, a sensor 122 on each side 122n (only one side depicted), and a sensor 122 on its retractable hand 122b. The robot 100 may include any number of sensors 122 as part of the sensor system 120 in order to generate sensor data 124 for the robotic environment 10 about the robot 100.

When surveying a field of view Fv with a sensor 122, the sensor system 120 generates sensor data 124 corresponding to the field of view Fv. In some examples, the sensor data 124 is image data that corresponds to a three-dimensional volumetric point cloud generated by a three-dimensional volumetric image sensor 122. Additionally or alternatively, when the robot 100 is maneuvering about the robotic environment 10, the sensor system 120 gathers pose data for the robot 100 that includes inertial measurement data (e.g., measured by an IMU). In some examples, the pose data includes kinematic data and/or orientation data about the robot 100.

Sensor data 124 gathered by the sensor system 120, such as the image data, pose data, inertial data, kinematic data, etc., relating to the robotic environment 10 may be communicated to the computing hardware 110 (e.g., the data processing hardware 112 and memory hardware 114) of the robot 100. In some examples, the sensor system 120 gathers and stores the sensor data 124 (e.g., in the memory hardware 114 or memory hardware 146 of remote resources 142). In other examples, the sensor system 120 gathers the sensor data 124 in real-time and processes the sensor data 124 without storing raw (i.e., unprocessed) sensor data 124. In yet other examples, the computing hardware 110 and/or remote resources 142 store both the processed sensor data 124 and raw sensor data 124.

FIGS. 2A-2D are examples of maps 200, 200a-d generated by the robot 100 and/or remote system 140. Each map 200 is a representation of an environment (e.g., the robotic environment 10) used to autonomously guide the robot 100. The robot 100 (or the remote system 140) generates the map 200 by receiving the image data 124 of the robotic environment 10 captured by one or more vision sensors 122, 122a-c of the sensor system 120 as the robot 100 maneuvers about the robotic environment 10 as shown in FIG. 1. In some examples, the robot 100 generates the map 200 with computing hardware 110, while in other examples, the remote system 140 generates the map 200 with remote resources 142. Once either the computing hardware 110 or the remote system 140 generates the map 200, the map 200 is communicated to the traversal system 116 to execute the behavior system 102 of the robot 100. Here, the behavior system 102 controls the robot 100 to traverse within the robotic environment 10 according to the map 200. The map 200 may be generated by the same robot 100 that traverses the robotic environment 10 or a different robot.

Some advantages of the map 200 may be used immediately, repeatedly, and/or transferrably for another robot with a similar sensor system 120. Here, the map 200 requires no final optimization once all the sensor data 124 has been collected.

Furthermore, the robot 100 may autonomously navigate the robotic environment 10 using the map 200 without global positioning information or other navigation data from a beacon. Each map 200 may be automatically processed by the systems of the robot 100 (or the remote system 140) or manually processed (e.g., editing waypoints 210, edges 220, basins 230 (FIG. 2B), constraints 240 (FIG. 2C), etc.). This enables the map 200 to be flexible to include additional data (e.g., annotations 222) or to provide adjusted robotic behaviors (e.g., suppressing ICP localization in feature-less areas). Moreover, modifying waypoints 210 or edges 220 of the map 200 (e.g., by adding, editing, or removing) should have no effect on non-modified portions of the map 200, and thus, simplifying quality control.

The map 200 includes waypoints 210 and edges 220 (also referred to as waypoint edges) forming connections between waypoints 210. A waypoint 210 is a representation of what the robot 100 sensed (e.g., according to its sensor system 120) at a particular place within the robotic environment 10. The robot 100 and/or remote system 140 generates waypoints 210 based on the image data 124 collected by the sensor system 120 of the robot. Because the map 200 is generated by waypoints 210, the map 200 may be locally consistent (e.g., spatially consistent within an area due to neighboring waypoints), but does not need to be globally accurate and/or consistent.

With the image data 124, the robot 100 and/or remote system 140 executes at least one waypoint heuristic 212 (FIG. 1) (e.g., waypoint algorithm). The at least one waypoint heuristic 212 is configured to trigger a waypoint placement on the map 200. For example, the waypoint heuristic 212 is configured to detect a threshold feature detection within the image data 124 at a location of the robot 100 (e.g., when generating or updating the map 200). The waypoint heuristic 212 may identify features within the robotic environment 10 that function as reliable vision sensor features offering repeatability for the robot 100 to maneuver about the robotic environment 10. For instance, the waypoint heuristic 212 is pre-programmed for feature recognition (e.g., programmed with stored features) or programmed to identify features where spatial clusters of volumetric image data 124 occur (e.g., corners of rooms or edges of walls). In response to the at least one waypoint heuristic 212 triggering the waypoint placement, the robot 100 and/or remote system 140 records the waypoint 210 on the map 200. This waypoint identification process may be repeated as the robot 100 is manually driven through an area (e.g., the robotic environment 10). In some examples, the robot 100 and/or remote system 140 stores a plurality of maps 200 generated for areas that the robot 100 has previously sensed (via its sensor system 120).

Each waypoint 210 is generally associated with a waypoint edge 220. More specifically, an edge 220 is configured to indicate how one waypoint 210 (e.g., a first waypoint 210a) is related to another waypoint 210 (e.g., a second waypoint 210b). For example, the edge 220 represents a positional relationship between waypoints 210 (e.g., adjacent waypoints 210). In other words, the edge 220 is a connection between two waypoints 210 (e.g., the edge 220a shown in FIG. 2A as a connection between a first waypoint 210a and a second waypoint 210b). For instance, the edge 220 is a path (e.g., a movement path for the robot 100) between the first waypoint 210a to the second waypoint 210b. In some examples, each edge 220 includes a pose transform that expresses how the robot 100 moves along the edge 220 between two waypoints 210. Pose transformations may describe a position and/or orientation of one coordinate frame within an environment relative to another coordinate frame. In some implementations, the edge 220 includes a full three-dimensional transform (e.g., six numbers). Some of these numbers include various estimates such as, for example, a dead reckoning pose estimation, a vision based estimation, or other estimations based on kinematics and/or inertial measurements of the robot 100.

In some examples, the edge 220 includes annotations 222 associated with the edge 220 that provide further indication/description of the robotic environment 10. Some examples of annotations 222 include a description or an indication that an edge 220 is located on stairs or crosses a doorway. These annotations 222 may aid the robot 100 during maneuvering especially when visual information is missing or lacking (e.g., a void such as a doorway). In some configurations, the annotations 222 include directional constraints (also may be referred to as pose constraints). A directional constraint of the annotation 222 may specify an alignment and/or an orientation (e.g., a pose) of the robot 100 at a particular environment feature. For example, the annotation 222 specifies a particular alignment or pose for the robot 100 before traveling along stairs or down a narrow corridor which may restrict the robot 100 from turning.

In some implementations, each waypoint 210 of the map 200 also includes sensor data 124 corresponding to data collected by the sensor system 120 of the robot 100 when the robot 100 sensed the robotic environment forming the map 200. Here, the sensor data 124 at a waypoint 210 enables the robot 100 to localize by comparing real-time sensor data 124 gathered as the robot 100 traverses the robotic environment 10 according to the map 200 with sensor data 124 stored for the waypoints 210 of the map 200. In some configurations, after the robot 100 moves along an edge 220 (e.g., with the intention to be at a target waypoint 210), the robot 100 is configured to localize by directly comparing real-time sensor data 124 with the map 200 (e.g., sensor data 124 associated with the intended target waypoint 210 of the map 200). Here, by storing raw or near-raw sensor data 124 with minimal processing for the waypoints 210 of the map 200, the robot 100 may use real-time sensor data 124 to localize efficiently as the robot 100 maneuvers within the mapped robotic environment 10. In some examples, an iterative closest points (ICP) algorithm localizes the robot 100 with respect to a waypoint 210.

Figure 2A:
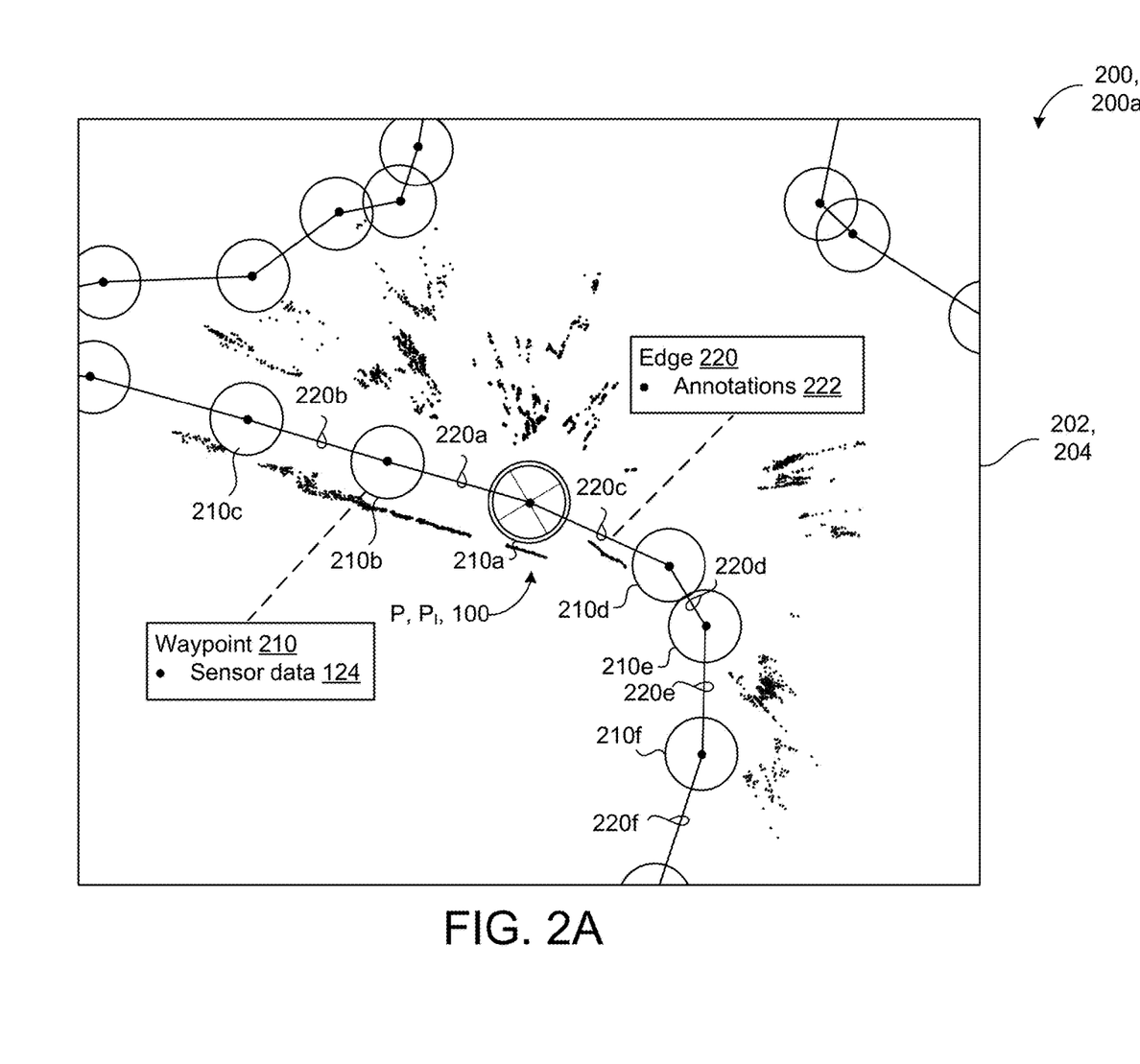
FIG. 2A is a schematic view of an example of a map for the robot.

The sensor data 124 may also allow the initialization of the robot 100 to autonomously traverse the robotic environment 10 using the map 200. In some examples, the robot 100 initially receives a hint defining an initial pose P, Pi (e.g., as shown in FIG. 2A) of the robot 100 relative to a waypoint 210. The robot 100 may be configured to receive this hint automatically or from an operator of the robot 100. Here, the pose P refers to a kinematic position and/or orientation of the robot 100. With the initial pose Pi of the robot 100 relative to a respective waypoint 210, the robot 100 traverses the map 200 according to commands from the traverse system 116 that instruct the robot 100 to move along edges 220. For example, the map 200a of FIG. 2A shows the robot 100 moving between waypoints 210a-f along edged 220a-f In some configurations, the map 200 includes an unprocessed map 202 and/or a processed map 204. The unprocessed map 202 is a map 200 that includes all the raw or nearly raw sensor data 124 gathered by the sensor system 120 of the robot 100 during generation of the map 200 (e.g., shown as points and/or point clouds in FIG. 2A). In contrast, the processed map 204 processes sensor data 124 for a waypoint 210 with immediate neighbors of the waypoint 210. In other words, a processed map 204 may contain a greater extent of data, such as data for multiple waypoints 210 within the robotic environment 110. In some examples, the processed map 204 reduces noise near waypoints 210 and edges 220 to increase the effectiveness for autonomous traversal. For example, referring to the map 200a of FIG. 2A, the sensor data 124 for waypoint 210a will be processed with all sensor data 124 of neighboring waypoints 210b, 210d. In some examples, the processed map 204 depicts, as a visual image for the processed map 204, points (e.g., volumetric points) that correspond to an edge 220. As an example, for a given waypoint 210a, the robot 100 or remote system 140 generating the processed map 204 (i.e., the processing system), identifies neighboring waypoints 210b, 210d for the given waypoint 210a. With the identified neighboring waypoints 210b, 210d, the traversal system 116 determines whether three-dimensional points of a three-dimensional point cloud corresponding the waypoints 210a, 210b, 210d corresponds to a visual edge of an image represented by the three-dimensional point cloud data. Based on this determination, the traversal system 116 associates with the given waypoint 210a the three-dimensional points that correspond to the visual edge of the image represented by the three-dimensional point cloud data. Additionally or alternatively, the processing for the processed map 204 removes any sensor data 124 along an edge 220 that has not been observed by the sensor system 120 from multiple vantage points.

Figure 2B:
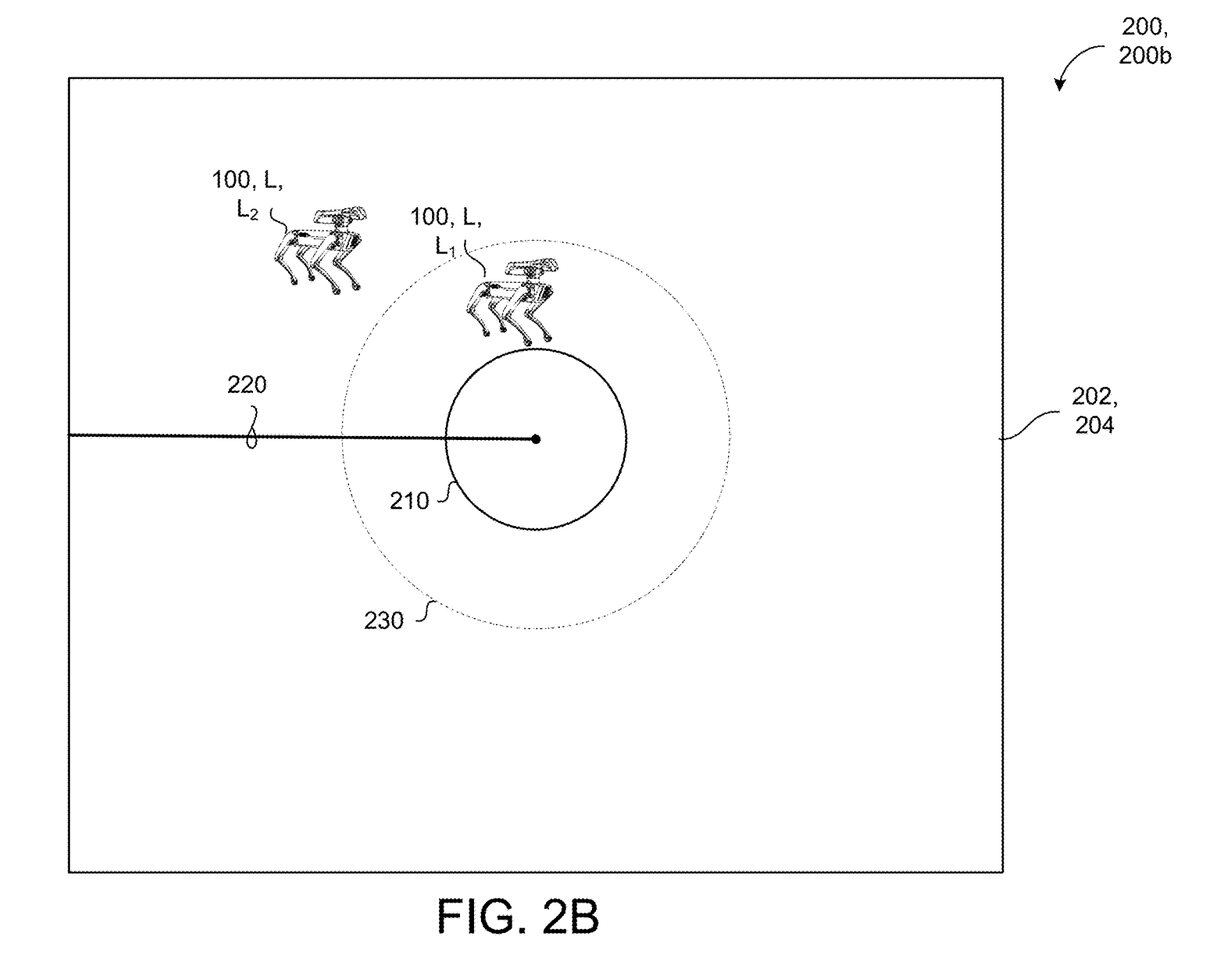
FIG. 2B is a schematic view of an example waypoint of a map with a basin.

FIG. 2B is an example of a map 200b that uses basin zones around one or more waypoints 210. Here, a waypoint 210 is configured with a corresponding basin 230. The basin 230 refers to a designated zone around the waypoint 210 (e.g., shown in FIG. 2B as the area within the dotted circle labeled 230) where the robot 100 uses the ICP algorithm to determine its movement relative to the waypoint 210. By using the ICP algorithm, the robot 100 may fine-tune its position. When the robot 100 determines that a location L of the robot 100 is outside of the basin 230 of a corresponding waypoint 210, the robot 100 is configured to use kinematics and/or inertial measurements to determine the movement of the robot 100. In the example shown, when the robot 100 is at a first location Li, the robot 100 uses an ICP algorithm to determine the movement of the robot 100. Yet when the robot 100 is at a second location L2, the robot 100 determines the movement of the robot 100 according to kinematics and/or inertial measurements.

In some examples, the area within the waypoint 210 is referred to as a goal zone. Once the robot 100 is within the goal zone, the robot 100 has successfully navigated to the waypoint 210. Upon successful navigation to the waypoint 210 (i.e., entry of the goal zone) the robot 100 may proceed to move toward a subsequent waypoint 210 along a path of the robot 100.

In some configurations, when a quality of the localization is poor, the traversal system 116 may cease to autonomously guide the robot 100 according to the map 200.

This cessation may occur based on the basin 230 or based on, for example, a localization threshold (e.g., a location L from the waypoint 210 where an operator of the robot 100 would consider the robot 100 lost). For instance, the localization threshold is a distance from a waypoint 210 determined to be outside a range of the waypoint 210 to perform localization based on the ICP algorithm.

Additionally or alternatively, the robot 100 may utilize global positioning (e.g., a global positioning system (GPS) receiver) while navigating according to kinematics, inertial measurements, or the ICP algorithm. In some examples, the robot 100 first uses a map 200 to determine an initial heading for the robot 100 (e.g., along an edge 220 between waypoints 210), but subsequently supplements navigation (e.g., supplements kinematics, inertial measurements, or the ICP algorithm) with GPS measurements received at the robot 100 from a GPS receiver. In some configurations, the computing hardware 110 is configured to receive GPS measurements (e.g., the computing hardware 110 is configured with a GPS receiver). A supplemental GPS system may be particularly useful when the robot 100 is navigating in an outdoor robotic environment 10. The robot 100 may be configured such that the robot 100 always uses the GPS system or utilizes the GPS system to provide navigation inputs when the robot 100 senses a particular robotic environment 10 (e.g., when the robot 100 senses an outdoor environment with less adjacent features). For instance, when the quality of the localization is poor, the robot 100 activates and/or uses the GPS system to provide navigational inputs. In some configurations, the GPS system traces the path of the robot 100. In these configurations, the GPS path may be compared to the edges 220 on a map 200 to provide feedback to the traversal system 116 (e.g., to fine-tune autonomous navigation using the traversal system 116).

Figure 2C:
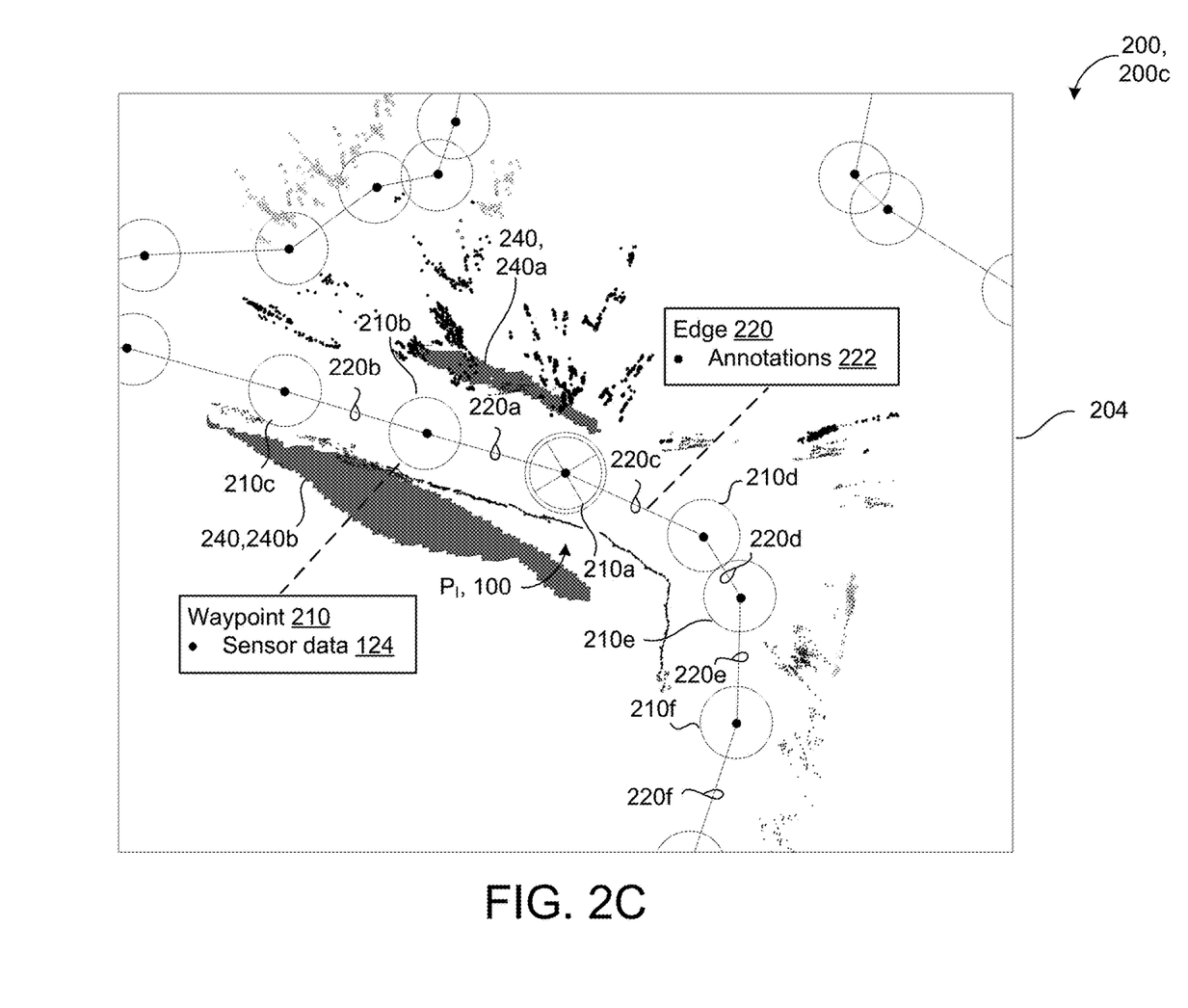
FIG. 2C is a schematic view of example map with map constraints.

Referring to FIG. 2C, in some implementations, a map 200c includes map constraints 240, 240a-b. A map constraint 240 refers to a virtual obstacle that prevents the robot 100 from deviating into areas designated or blocked with the virtual obstacle. In other words, a map constraint 240 may help prevent the robot 100 from significantly departing from a movement path corresponding to one or more edges 220. The map constraint 240 may be placed relative to a recorded path, manually added by an operator, or precomputed based on scene geometry. For example, in FIG. 2C, the edges 220a-c may correspond to a corridor. When the robot 100 recorded the map 200 with waypoints 210a-c and edges 220a-c corresponding to the corridor, the robot 100 may have never been driven into rooms and/or doorways on either side of the corridor. It may be advantageous to block off these rooms at their respective doorways by a first map constraint 240a and a second map constraint 240b. Accordingly with the first map constraint 240a and the second map constraint 240b, the robot 100 should be prevented from wandering into the rooms when following the edges 220a-c, thereby preventing the robot 100 from becoming lost or off-course.

Figure 2D:
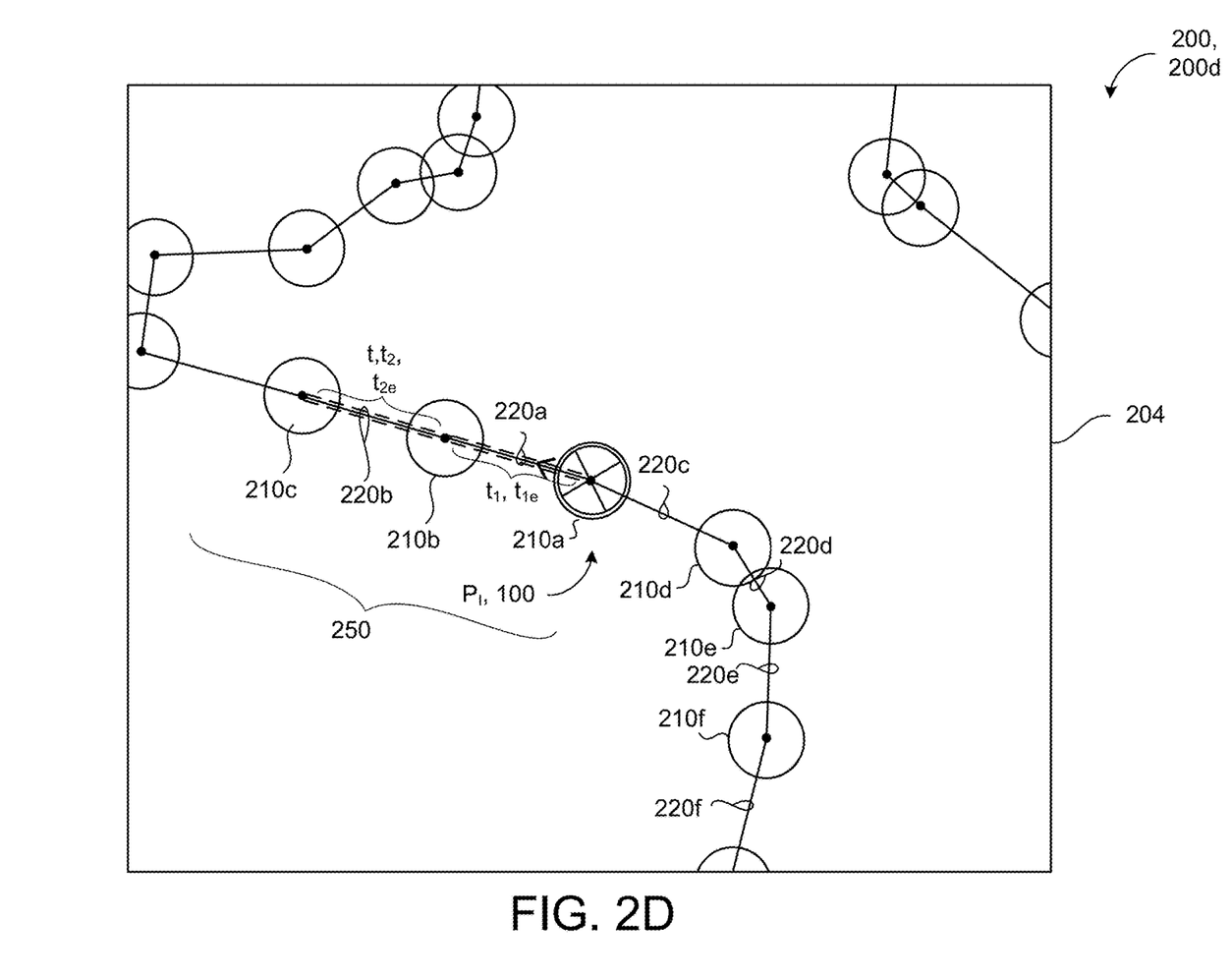
FIG. 2D is a schematic view of an example map for the robot.

FIG. 2D shows a map 200d (e.g., a processed map 204) with a time-indexed robot trajectory 250 that the traversal system 116 configures the robot 100 to follow. The time-indexed robot trajectory 250 is a movement trajectory for the robot 100 between waypoints 210. The time-indexed robot trajectory 250 may also be referred to as a traversal path 250. Here, FIG. 2D depicts the time-indexed robot trajectory 250 by an arrowhead pointing from a first waypoint 210a where the robot 100 is currently positioned (shown as an "X" within the waypoint 210a) towards a third waypoint 210c. To navigate the time-indexed robot trajectory 250, the robot 100 will traverse edges 220a, 220b.

In some examples, the traversal system 116 generates a time-indexed robot trajectory 250 across upcoming waypoints 210 for movement of the robot 100. In some implementations, for the time-indexed robot trajectory 250, the traversal system 116 specifies that an orientation for the robot 100 at each waypoint 210 is halfway between current and next edges 220 of a route through a respective waypoint 210. Here, the time t may be based on an expected time to to reach each waypoint 210 due to the trajectory. As the robot 100 travels the trajectory 250, times t (e.g., the time t2 to travel from a second waypoint 210b to the third waypoint 210c) for the trajectory 250 may be updated based on updated estimates of when the robot 100 should reach each waypoint 210. In this configuration, when a time t corresponding to a waypoint 210 is close to a current time, the waypoint's time is updated. In some examples, after the current time passes a time associated with the waypoint 210, the traversal system 116 considers the waypoint 210 reached and subsequently removes it from the trajectory.

Additionally or alternatively, as shown in the maps 200a, 200c of FIGS. 2A and 2C, annotations 222 associated with edges 220 may modify an orientation of the robot 100 at waypoints 210 associated with a time-indexed robot trajectory such that the robot 100 conforms with a directional constraint of the annotation 222. Based on these directional constraints, an orientation of the robot 100 may also be estimated for a waypoint 210 within the trajectory. When an orientation estimate determines that the orientation will be incorrect in light of the directional constraint, an orientation segment (e.g., a turn-in-place segment) may be added to the time-indexed robot trajectory to ensure that the robot 100 complies with the directional constraint.

Referring back to FIG. 1, the behavior system 102 of the robot 100 may optionally receive a path description 206 from the traversal system 116 that includes goal conditions and constraint conditions for reaching one or more waypoints 210. Based on these goal conditions and constraint conditions, the robot 100 follows the path description 206 with an ability to adjust its route as long as the adjusted route satisfies the goal and constraint conditions. Some examples of conditions include specifying a position or orientation for the robot 100 at or around a target waypoint 210 or specifying a position, orientation, and/or speed for travel to the target waypoint 210.

Figure 3:
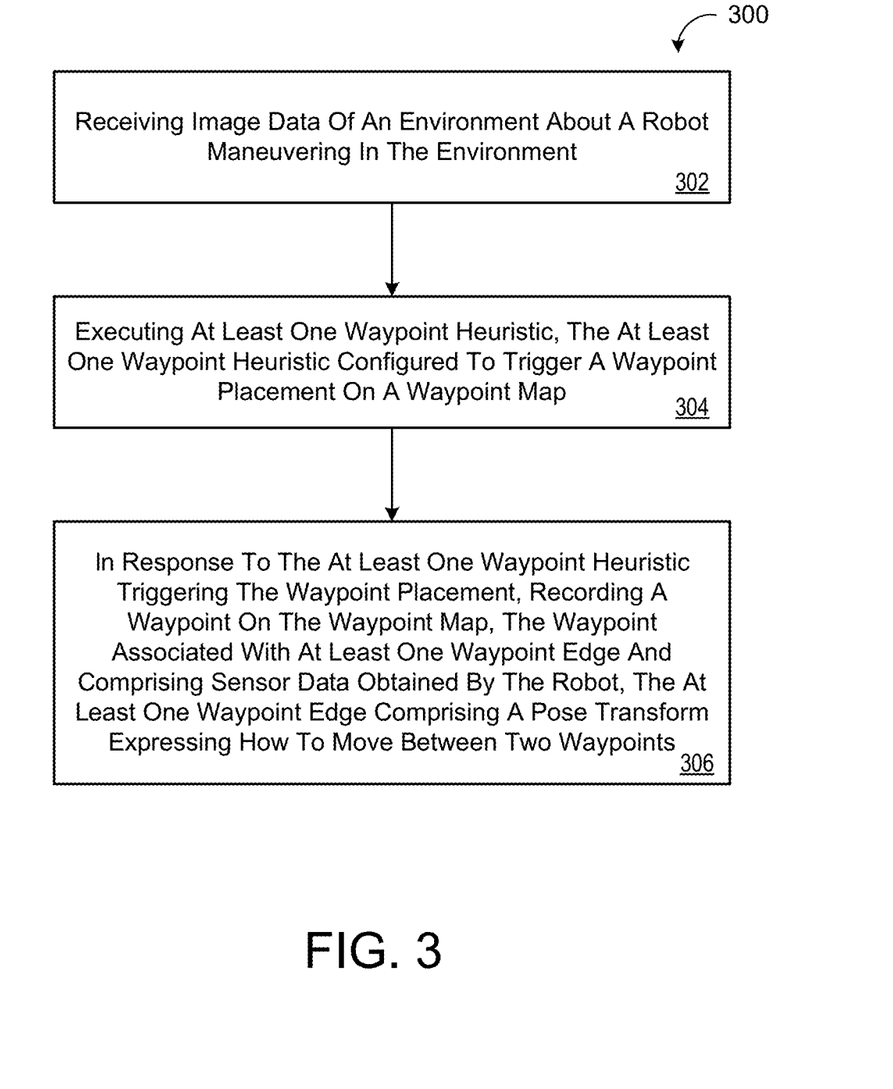
FIGS. 3 and 4 are flow diagrams of example arrangements for implementing robotic environment traversal for the robot.

FIG. 3 is an example flow diagram of a method 300 to configure a map 200. At operation 302, the method 300 receives image data 124 of a robotic environment 10 about a robot 100 maneuvering in the robotic environment 10. At operation 304, the method 300 executes at least one waypoint heuristic 212 where the at least one waypoint heuristic 212 is configured to trigger a waypoint placement on a waypoint map 200. In response to the at least one waypoint heuristic 212 triggering the waypoint placement, at operation 306, the method 300 records a waypoint 210 on the waypoint map 200. Here, the waypoint 210 is associated with at least one waypoint edge 220 and includes sensor data 124 obtained by the sensor system 120 of the robot 100. The at least one waypoint edge 220 may include a pose transform expressing how to move between two waypoints 210.

Figure 4:
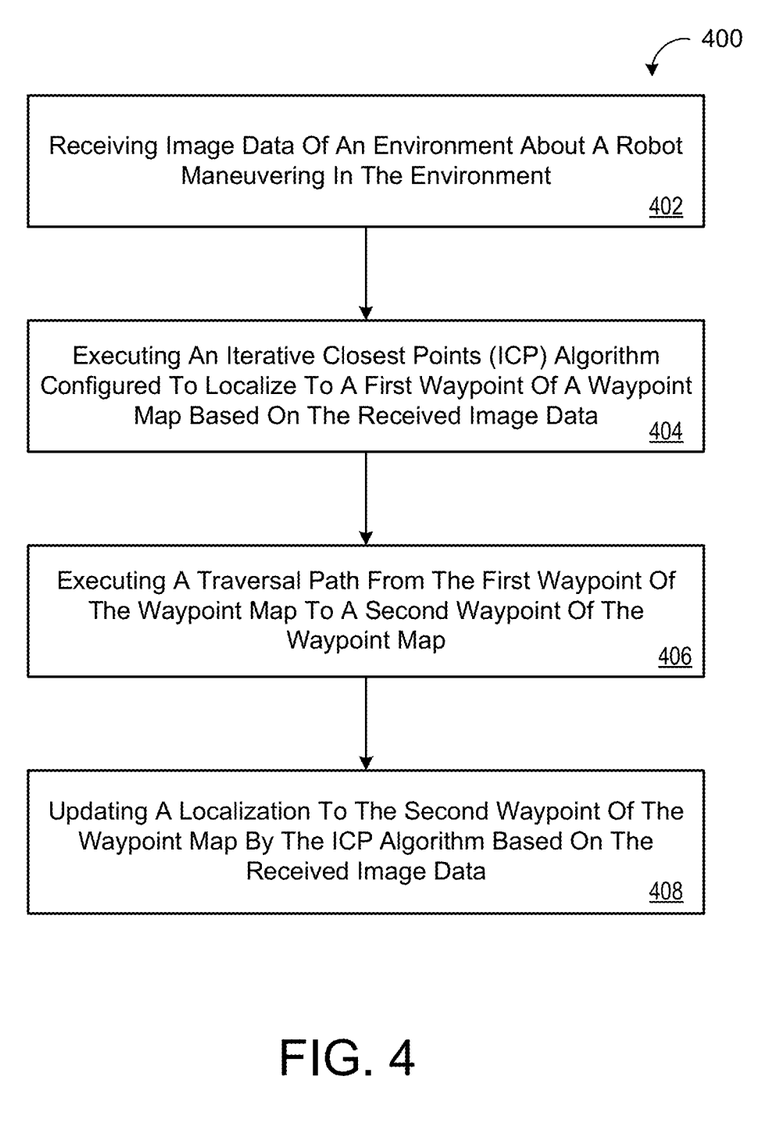

FIG. 4 is an example flow diagram of method 400 to localize the robot 100 with respect to a waypoint map 200. At operation 402, the method 400 receives image data 124 of a robotic environment 10 about a robot 100 maneuvering in the robotic environment 10. At operation 404, the method 400 executes an iterative closest points (ICP) algorithm configured to localize to a first waypoint 210a of the waypoint map 200 based on the received image data 124. At operation 406, the method 400 executes a traversal path 250 from the first waypoint 210a of the waypoint map 200 to a second waypoint 210b of the waypoint map 200. At operation, 404, the method 400 updates the localization to the second waypoint 210b of the waypoint map 200 by the ICP algorithm based on the received image data.

Figure 5:
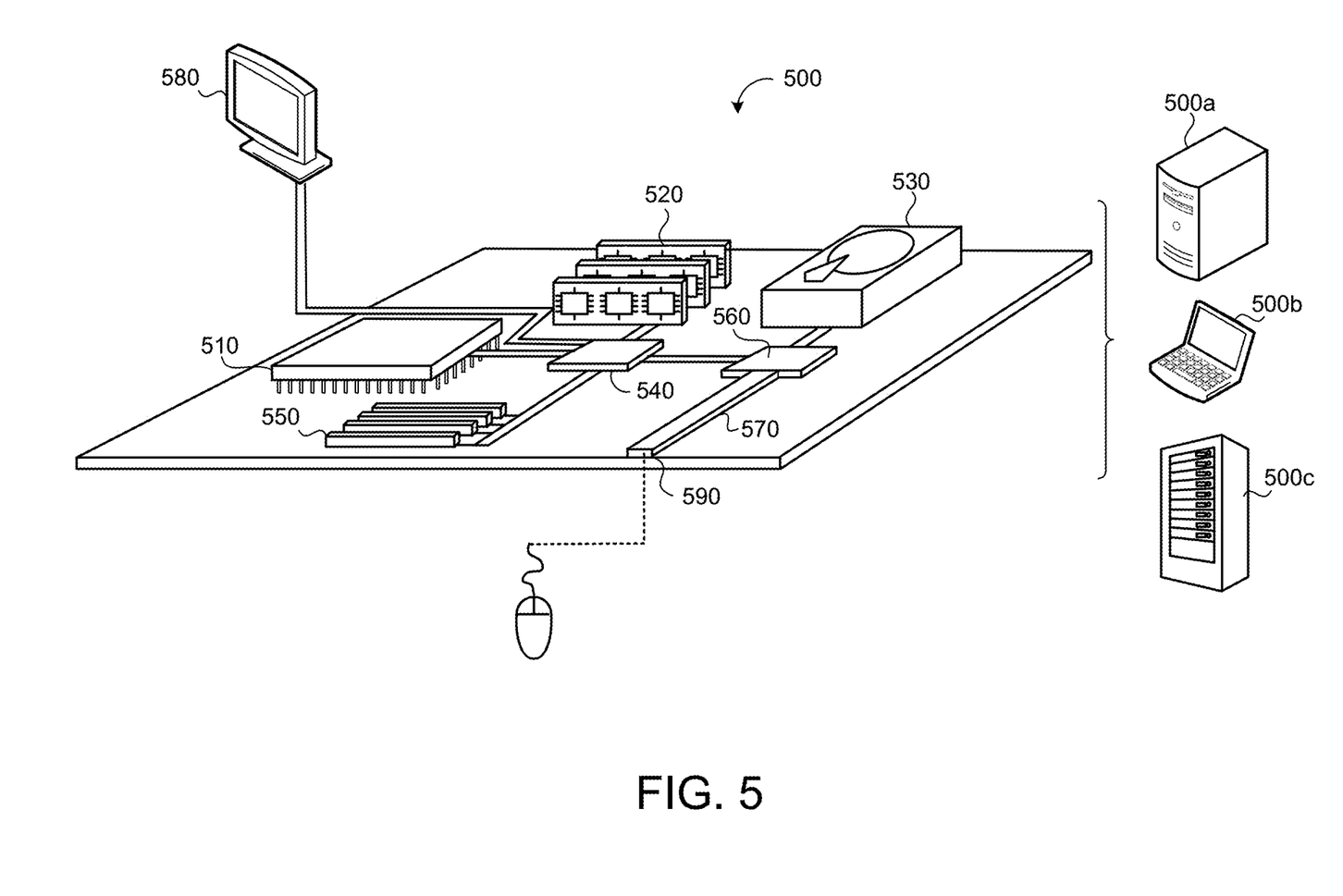
FIG. 5 is a schematic view of an example computing device that may be used to implement the systems and methods described herein.

FIG. 5 is schematic view of an example computing device 500 that may be used to implement the systems and methods described in this document, for example, the behavior system 102, the computing hardware 110, the traversal system 116, orl the remote resources 142. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A robot comprising:
  a body having a longitudinal axis defining a forward direction of locomotion, a right side, a left side opposite the right side, a front end portion, and a rear end portion opposite the front end portion;
  a right front leg coupled to the body on the right side adjacent the front end portion;
  a right hind leg coupled to the body on the right side adjacent the rear end portion;
  a left front leg coupled to the body on the left side adjacent the front end portion;
  a left hind leg coupled to the body on the left side adjacent the rear end portion; and
  a vision system disposed on the body, the vision system comprising:
    a first three-dimensional volumetric image sensor and a first image sensor located between the right front leg and the right hind leg on the right side of the body and horizontally mounted along a length of the right side of the body, the first three-dimensional volumetric image sensor configured to generate a first three-dimensional volumetric point cloud, wherein the first three-dimensional volumetric image sensor and the first image sensor are different types of image sensors;
    a second three-dimensional volumetric image sensor and a second image sensor located between the left front leg and the left hind leg on the left side of the body and horizontally mounted along a length of the left side of the body, the second three-dimensional volumetric image sensor configured to generate a second three-dimensional volumetric point cloud, wherein the second three-dimensional volumetric image sensor and the second image sensor are different types of image sensors; and
    one or more front image sensors located between the right front leg and the left front leg on the front end portion of the body, the one or more front image sensors extending along the front end portion of the body,
  wherein the vision system is configured to obtain sensor data, the sensor data comprising pose data captured from an inertial measurement unit and image data captured from the first three-dimensional volumetric image sensor, the first image sensor, the second three-dimensional volumetric image sensor, the second image sensor, and the one or more front image sensors, and wherein a computing system is configured to process the sensor data to generate a map for controlling at least one of the right front leg, the right hind leg, the left front leg, or the left hind leg to maneuver the robot about an environment.

2. The robot of claim 1, wherein at least one of:
  three image sensors are located between the right front leg and the right hind leg on the right side of the body and horizontally mounted along the length of the right side of the body; or three image sensors are located between the left front leg and the left hind leg on the left side of the body and horizontally mounted along the length of the left side of the body.

3. The robot of claim 1, wherein at least one of:
three image sensors are located between the right front leg and the right hind leg on the right side of the body and horizontally mounted along the length of the right side of the body; or
three image sensors are located between the left front leg and the left hind leg on the left side of the body and horizontally mounted along the length of the left side of the body, wherein at least one of the first three-dimensional volumetric image sensor, the first image sensor, the second three-dimensional volumetric image sensor, and the second image sensor comprises a stereo camera.

4. The robot of claim 1, wherein each of the first three-dimensional volumetric image sensor, the first image sensor, the second three-dimensional volumetric image sensor, and the second image sensor has a housing with a longitudinal axis extending along a length of the body on a respective side of the body.

5. The robot of claim 1, wherein the one or more front image sensors comprises a column of image sensors.

6. The robot of claim 1, wherein the one or more front image sensors comprises three image sensors located between the right front leg and the left front leg.

7. The robot of claim 1, wherein at least one of the first image sensor or the second image sensor comprises a stereo camera.

8. The robot of claim 1, wherein the vision system further comprises a movable image sensor disposed on an arm coupled to the body.

9. The robot of claim 1, wherein the first three-dimensional volumetric image sensor, the first image sensor, the second three-dimensional volumetric image sensor, the second image sensor, and the one or more front image sensors captures three-dimensional point cloud data.

10. The robot of claim 1, wherein the first three-dimensional volumetric image sensor, the first image sensor, the second three-dimensional volumetric image sensor, the second image sensor, and the one or more front image sensors collectively gather sensor data in all directions about the robot.

11. A computer-implemented method when executed by data processing hardware of a robot causes the data processing hardware to perform operations comprising:
receiving sensor data from a vision system of the robot, the robot comprising:
a body having a longitudinal axis defining a forward direction of locomotion, a right side, a left side opposite the right side, a front end portion, and a rear end portion opposite the front end portion;
a right front leg coupled to the body on the right side adjacent the front end portion;
a right hind leg coupled to the body on the right side adjacent the rear end portion;
a left front leg coupled to the body on the left side adjacent the front end portion;
a left hind leg coupled to the body on the left side adjacent the rear end portion; and
a vision system disposed on the body, the vision system comprising:
a first three-dimensional volumetric image sensor and a first image sensor located between the right front leg and the right hind leg on the right side of the body and horizontally mounted along a length of the right side of the body, the first three-dimensional volumetric image sensor configured to generate a first three-dimensional volumetric point cloud, wherein the first three-dimensional volumetric image sensor and the first image sensor are different types of image sensors;
a second three-dimensional volumetric image sensor and a second image sensor located between the left front leg and the left hind leg on the left side of the body and horizontally mounted along a length of the left side of the body, the second three-dimensional volumetric image sensor configured to generate a second three-dimensional volumetric point cloud, wherein the second three-dimensional volumetric image sensor and the second image sensor are different types of image sensors; and
one or more front image sensors located between the right front leg and the left front leg on the front end portion of the body, the one or more front image sensors extending along the front end portion of the body,
wherein the vision system is configured to obtain the sensor data, the sensor data comprising pose data captured from an inertial measurement unit and image data captured from the first three-dimensional volumetric image sensor, the first image sensor, the second three-dimensional volumetric image sensor, the second image sensor, and the one or more front image sensors;
processing the sensor data to generate a map for controlling of at least one of the right front leg, the right hind leg, the left front leg, or the left hind leg to maneuver the robot about an environment; and
communicating the map to a drive system of the robot, the drive system configured to maneuver the robot about the environment using the map.

12. The method of claim 11, wherein at least one of:
three image sensors are located between the right front leg and the right hind leg on the right side of the body and horizontally mounted along the length of the right side of the body; or
three image sensors are located between the left front leg and the left hind leg on the left side of the body and horizontally mounted along the length of the left side of the body.

13. The method of claim 11, wherein at least one of:
three image sensors are located between the right front leg and the right hind leg on the right side of the body and horizontally mounted along the length of the right side of the body; or
three image sensors are located between the left front leg and the left hind leg on the left side of the body and horizontally mounted along the length of the left side of the body, wherein at least one of the first three-dimensional volumetric image sensor, the first image sensor, the second three-dimensional volumetric image sensor, and the second image sensor comprises a stereo camera.

14. The method of claim 11, wherein each of the first three-dimensional volumetric image sensor, the first image sensor, the second three-dimensional volumetric image sensor, and the second image sensor has a housing with a longitudinal axis extending along a length of the body on a respective side of the body.

15. The method of claim 11, wherein the one or more front image sensors comprises a column of image sensors.

16. The method of claim 11, wherein the one or more front image sensors comprises three image sensors located between the right front leg and the left front leg.

17. The method of claim 11, wherein at least one of the first image sensor or the second image sensor comprises a stereo camera.

18. The method of claim 11, wherein the vision system further comprises a movable image sensor disposed on an arm coupled to the body.

19. The method of claim 11, wherein the first three-dimensional volumetric image sensor, the first image sensor, the second three-dimensional volumetric image sensor, the second image sensor, and the one or more front image sensors captures three-dimensional point cloud data.

20. The method of claim 11, wherein the first three-dimensional volumetric image sensor, the first image sensor, the second three-dimensional volumetric image sensor, the second image sensor, and the one or more front image sensors collectively gather sensor data in all directions about the robot.

\* \* \* \* \*